United States Patent
Pfrommer et al.

(10) Patent No.: US 9,287,546 B2
(45) Date of Patent: Mar. 15, 2016

(54) GALVANIC ELEMENT FOR HIGH STRESSES

(75) Inventors: Stefan Pfrommer, Eiken (CH); Ulrich Ockenfuss, Schiltach (DE); Pascal Haering, Aesch (CH); Dirk Jansen, Ohlsbach (DE)

(73) Assignee: Renata AG, Itingen (CH)

( * ) Notice: Subject to any disclaimer, the term of this patent is extended or adjusted under 35 U.S.C. 154(b) by 702 days.

(21) Appl. No.: 12/688,108

(22) Filed: Jan. 15, 2010

(65) Prior Publication Data
US 2010/0183912 A1 Jul. 22, 2010

(30) Foreign Application Priority Data
Jan. 19, 2009 (EP) .................................... 09150875

(51) Int. Cl.
| H01M 2/18 | (2006.01) |
| H01M 2/02 | (2006.01) |
| H01M 2/04 | (2006.01) |
| H01M 2/14 | (2006.01) |
| H01M 10/04 | (2006.01) |

(52) U.S. Cl.
CPC .............. *H01M 2/18* (2013.01); *H01M 2/0222* (2013.01); *H01M 2/0413* (2013.01); *H01M 2/14* (2013.01); *H01M 10/0427* (2013.01)

(58) Field of Classification Search
CPC ............ H01M 2/0222; H01M 2/0225; H01M 2/0227; H01M 2/023; H01M 2/0408; H01M 2/0413; H01M 2/0465; H01M 2/14; H01M 2/18; H01M 4/76; H01M 4/762; H01M 10/0427; H01M 10/124
See application file for complete search history.

(56) References Cited

U.S. PATENT DOCUMENTS

| 4,521,500 | A | * | 6/1985 | Watanabe | 429/174 |
| 5,187,033 | A | * | 2/1993 | Koshiba | 429/231.1 |
| 5,800,944 | A | * | 9/1998 | Blonsky et al. | 429/174 |
| 6,027,829 | A | * | 2/2000 | Tuttle | 429/157 |
| 6,569,564 | B1 | * | 5/2003 | Lane | 429/164 |
| 6,656,638 | B1 | * | 12/2003 | Yamaura | 429/231.95 |

(Continued)

FOREIGN PATENT DOCUMENTS

| DE | 31 13 309 A1 | 10/1982 |
| DE | 196 51 976 A1 | 6/1998 |

(Continued)

OTHER PUBLICATIONS

"Periphery" as defined by Merriam-Webster's Online Dictionary (http://www.merriam-webster.com/dictionary/periphery) and the Google-define feature (https://www.google.com/#q=define:++periphery). Accessed by the Examiner on Jan. 24, 2014.*

(Continued)

*Primary Examiner* — Ula C Ruddock
*Assistant Examiner* — Amanda Barrow
(74) *Attorney, Agent, or Firm* — Oblon, McClelland, Maier & Neustadt, L.L.P.

(57) ABSTRACT

The present invention relates to a galvanic element, in particular an element of the button cell type, which has a long service life even when there are high mechanical or thermal loads. The element has a cathode, an anode, an electrolyte, a separator arranged between the anode and cathode, and a housing, which comprises a housing cup, a housing cover and a sealing element, the sealing element insulating the housing cup against the housing cover. According to the invention, the sealing element is rigidly connected to the separator.

11 Claims, 2 Drawing Sheets

(56) References Cited

U.S. PATENT DOCUMENTS

| | | | |
|---|---|---|---|
| 2005/0287423 A1* | 12/2005 | Yeh | 429/100 |
| 2006/0102472 A1* | 5/2006 | Bito et al. | 204/293 |
| 2006/0105236 A1* | 5/2006 | Zhu et al. | 429/176 |
| 2006/0183019 A1* | 8/2006 | Davidson et al. | 429/142 |
| 2006/0204839 A1* | 9/2006 | Richards et al. | 429/137 |
| 2007/0111099 A1* | 5/2007 | Nanjundaswamy et al. | 429/231.95 |
| 2007/0181740 A1* | 8/2007 | Sogabe | 242/608.8 |
| 2008/0138701 A1* | 6/2008 | Kuboki et al. | 429/129 |
| 2008/0213674 A1* | 9/2008 | Okada et al. | 429/344 |
| 2008/0241669 A1* | 10/2008 | Yabushita et al. | 429/162 |
| 2010/0173098 A1* | 7/2010 | Nagata et al. | 427/576 |

FOREIGN PATENT DOCUMENTS

| | | | | |
|---|---|---|---|---|
| JP | 62-290058 | * | 12/1987 | H01M 4/06 |
| JP | 63-175345 | * | 7/1988 | H01M 4/64 |
| JP | 08321287 A | | 12/1996 | |
| JP | 09-050815 | * | 2/1997 | H01M 6/16 |
| WO | 97/14187 A | | 4/1997 | |
| WO | WO/2008/152772 | * | 12/2008 | H01M 4/04 |

OTHER PUBLICATIONS

Search Report issued in the corresponding European application No. EP 09 15 0875, completed Apr. 21, 2009.

* cited by examiner

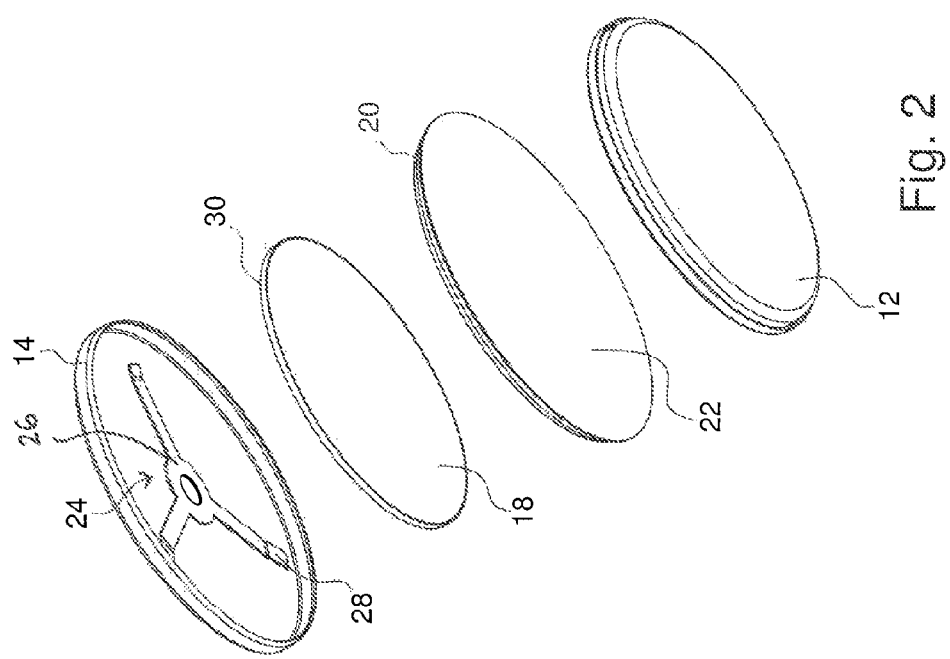
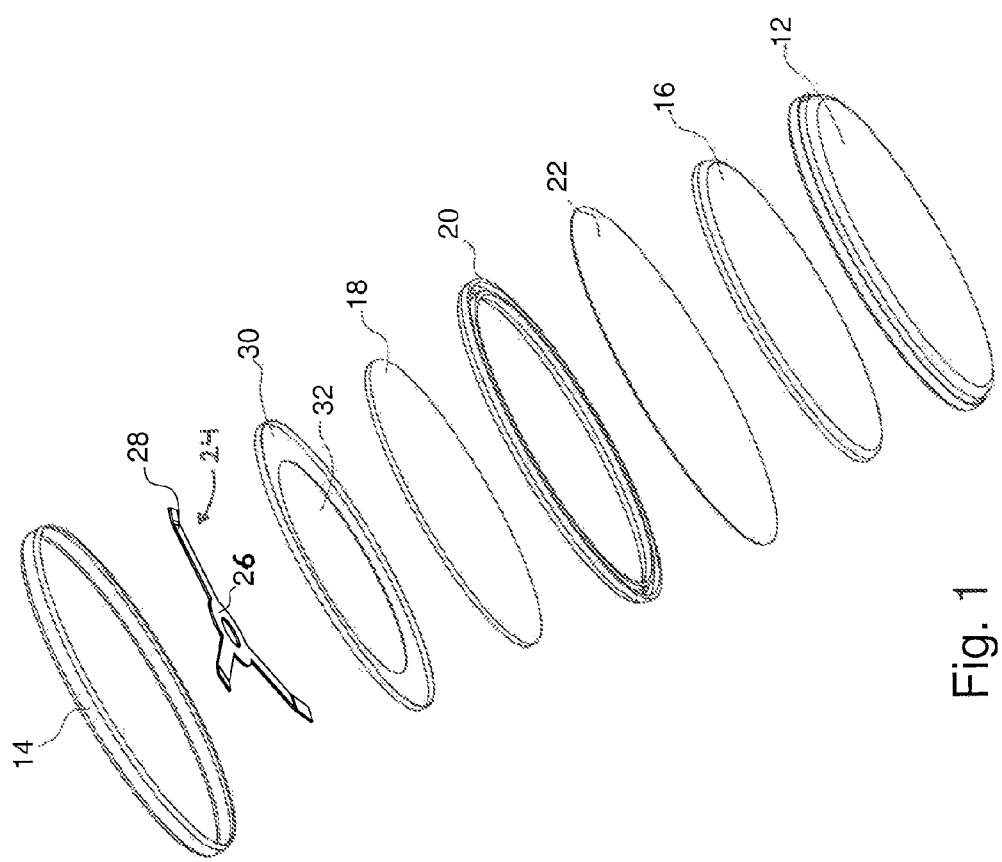

GALVANIC ELEMENT FOR HIGH STRESSES

This application claims priority from European Patent Application No. 09150875.4, filed Jan. 19, 2009, the entire disclosure of which is incorporated herein by reference.

FIELD OF THE INVENTION

The present invention relates to a galvanic element, in particular of the button cell type, with a cathode, an anode, an electrolyte, a separator arranged between the anode and cathode and a housing. The housing comprises a housing cup, a housing cover and a sealing element, the latter insulating the housing cup against the housing cover.

BACKGROUND OF THE INVENTION

Galvanic elements, in particular of the type in button cell form, generally have a housing of this type. Galvanic elements of this type may contain a wide variety of electrochemical systems, for example zinc/$MnO_2$, primary lithium systems or else secondary systems such as nickel/cadmium, nickel/metal hydride or secondary lithium systems.

The liquid-tight closure of such cells generally takes place by means of flanging the cup edge over the edge of the housing cover in connection with a plastics material ring, which is arranged between the housing cup and housing cover, and is simultaneously used as a sealing element and for the electrical insulation of the housing cup from the housing cover. Button cells of this type are known, for example, from DE 31 13 309.

In the known galvanic elements of this type, the separator is generally located in a sandwich-like manner between the anode and cathode, these three components being arranged concentrically with respect to one another. In this case, a narrow peripheral gap remains on the outside between the separator and the sealing element. In addition, the separator can slip, in particular in the case of high mechanical stressing of the galvanic element, in relation to the cathode and anode, whereby the existing gap is enlarged. Therefore, in the case of severe stressing of the galvanic element, for example by high temperatures or severe temperature fluctuations or if the element is subject to high accelerations or pressure differences, it may occur that particles of the cathode are released and move around the separator on the outside. This may lead to a short-circuit in the cell, which brings about a rapid and an uncontrolled self-discharge of the battery.

SUMMARY OF THE INVENTION

The present invention is based on the object of providing a galvanic cell of the type mentioned at the outset, in which this phenomenon is reliably avoided.

This object is achieved according to the invention in that the sealing element is rigidly connected to the separator. Thus, a peripheral gap no longer exists between the separator and the sealing element, through which particles from the cathode (or else the anode) move around the separator. It is also no longer possible for the separator to slip. Thus, a galvanic element is obtained which has a long service life even with high loads, for example in the case of high accelerations or high temperatures.

According to a preferred embodiment of the invention, the sealing element is substantially annular and is rigidly connected to the separator along its entire periphery. The galvanic element is divided into two chambers separated from one another by the continuous connection along the entire periphery, the anode being located in one of the chambers, and the cathode in the other chamber. The movement of individual particles around the separator is therefore ruled out.

The separator may be welded to the sealing element. Alternatively, the separator may also be glued to the sealing element. Other types of fastening are also conceivable, it being decisive that a permanent connection is obtained.

A sealing element is preferably used which has a substantially U-shaped cross-section in the radial direction. Sealing elements of this type are adequately known from the prior art and are generally used for galvanic cells according to the preamble of claim 1. According to a preferred embodiment of the invention, the separator projects radially outwardly at least over the inner side in the radial direction of the U of the sealing element, i.e. over the inner sealing lip. In this case, the separator is preferably rigidly connected to this inner sealing lip of the sealing element so, together with the inner sealing lip of the sealing element, it forms a cup-like unit which can receive an electrode, for example the cathode.

The part of the separator projecting radially outwardly over the inner sealing lip of the sealing element preferably bends substantially perpendicularly in relation to the plane, in which the central region of the separator is located, and then extends in the U of the sealing element along the inner sealing lip. In this case, the part of the separator projecting radially outwardly over the inner sealing lip is preferably clamped in between the housing cover and the inner sealing lip of the sealing element. The separator is thus not only held in place by the, for example, glued or welded connection to the sealing element, but the separator slipping and therefore the production of a gap is also prevented by the separator being clamped in between the housing cover and seal. An additional securing is thus achieved.

According to a preferred embodiment of the invention, the galvanic element furthermore comprises at least one electrically conductive spring element, which is supported on the housing cup or the housing cover and, by means of an electrically conductive intermediate element, presses the cathode or the anode in the direction of the separator. In this case, the cathode or the anode is then in electrical contact by means of the intermediate element and the spring element with the housing cup or the housing cover. If only one spring element is used, this is preferably located on the cathode side, i.e. it is supported on the housing cup and presses the cathode by means of an electrically conductive intermediate element, which is located between the spring and the cathode, in the direction of the separator. A solution is particularly preferred in which a spring element is used both on the anode side and on the cathode side, in each case.

The spring element is used to increase the reliability of the electrical contact between the electro-active material of the cathode or the anode, on the one hand, and the housing, on the other hand. The contact resistance between the cathode or anode material and the housing may be increased by the action of temperature or by high mechanical stressing, so the contact is impaired. This applies, in particular, if a part of the electro-active material is already consumed. The spring element is in electrical contact with the housing on one side and, on the other side, presses an electrically conductive intermediate element onto the cathode or the anode, so an electrically conductive connection is always produced between the cathode or anode and the housing. A reliable electrical contacting is therefore ensured.

The spring element is preferably rigidly connected to the housing cup or the housing cover, for example welded. This rigid connection of the spring element to the housing cup or the housing cover may be produced before the actual assembly of the galvanic element. The spring element can thus already be centered in advance in relation to the housing cup or the housing cover and can no longer slip during subsequent assembly.

According to a particularly preferred embodiment of the invention, the spring element has at least three spring arms arranged symmetrically with respect to its centre. In this case, each of the spring arms has a contact face, which rests on the electrically conductive intermediate element. The pressing force of the spring is uniformly distributed over the electrically conductive intermediate element owing to these arms arranged in a star shape, so the intermediate element is pressed perpendicularly to the plane of the separator in the direction of the anode or cathode. The intermediate element is in turn used to distribute the pressing force of the three arms over a larger contact face, so the arms of the spring element cannot drill into the electro-active material of the electrode.

The electrically conductive intermediate element may, for example, comprise a circular disc with a central recess, the diameter of the circular disc substantially corresponding to the diameter of the cathode and the anode. Owing to the recess, space is obtained for the active material. In principle, a narrow annular disc is sufficient as the electrically conductive intermediate element, on which the spring arms are supported.

BRIEF DESCRIPTION OF THE DRAWINGS

The invention will be described more precisely below with the aid of a preferred embodiment and with reference to the accompanying figures. In detail, in the figures:

FIG. 1 shows an exploded view of a galvanic element,

FIG. 2 shows a partially exploded view of the galvanic element from FIG. 1, and

FIG. 3 shows a section through a galvanic element according to the invention, which is a button cell here. FIG. 1 shows the individual components of the button cell before assembly. FIG. 2 shows an intermediate stage before the final assembly of the cell, in which individual components are already assembled with one another. The drawings are not true to scale as to understand the invention the precise dimensions are not important.

Figure 3:
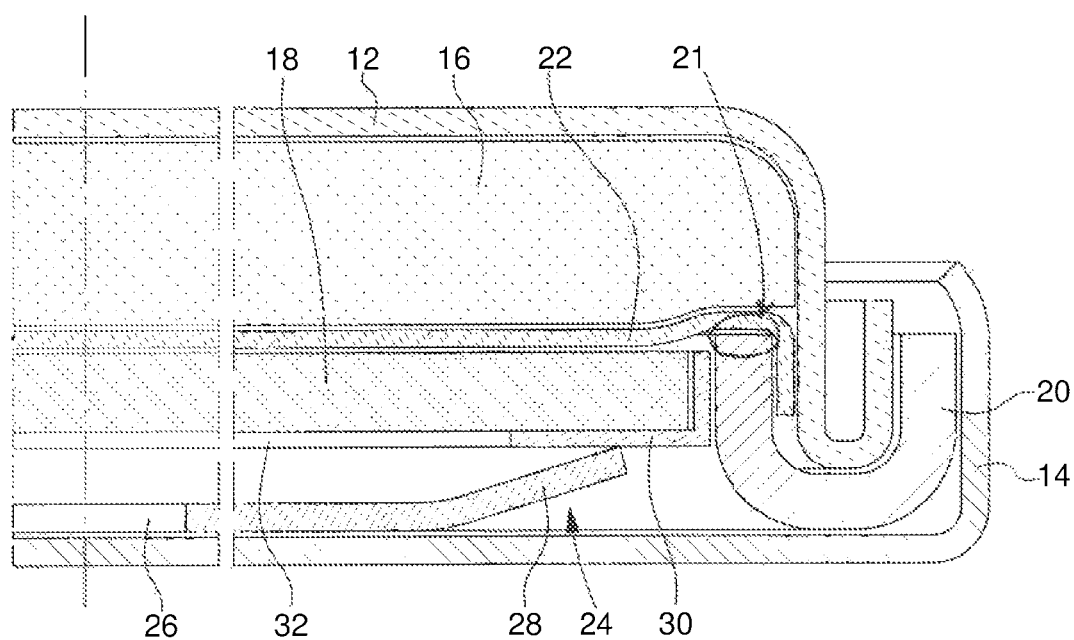
FIG. 3 shows a section through the galvanic element from FIGS. 1 and 2.

The button cell has a housing, which comprises a housing cup 14 and a housing cover 12, as known from the prior art.

An annular sealing element 20 with a U-shaped cross-section is used to seal the housing. This sealing element is simultaneously used to electrically insulate the housing cup 14 and the housing cover 12 from one another. The use of sealing rings of this type with a U-shaped cross-section is known from the prior art, so a more precise description of the sealing element and its position between the cup 14 and the cover 12 when the cell is completely assembled (cf. FIG. 3) is not to be given here.

Seated in the housing cup 14 is a spring element 24, which is produced precisely like the housing cup from a conductive material, for example a thin metal sheet. It may, for example, be punched out of a suitable metal sheet and then bent into shape. As can be seen in FIGS. 1 and 2, the spring element 24 has a substantially annular centre part 26, from which three arms 28 extended to an identical length. The three arms 28 have a rectangular basic face, and issue from the annular centre part 26 in a star shape. An angle of 120 is in each case located between two adjacent arms 28. The three arms 28 are angled away outwardly from the housing cup 14. Before the cell is assembled, the spring element 24 is welded to the housing cup 14. FIG. 2 shows, at the top, the housing cup 14 with the spring element 24 welded thereon, and it can be seen that the annular centre part 26 of the spring element 24 is seated centrally in the housing cup 14 and rests flat on the base of the housing cup 14, while the three angled arms 28 stand away from the base of the cup 14 and ensure the desired spring force, as will be described more precisely below.

An anode 16, for example a lithium tablet, is located, as usual, on the side of the housing cover 12. Located on the side of the housing cup 14 is a cathode 18 which may, for example, be a pressed manganese dioxide ($MnO_2$) tablet.

A support ring 30, which is shown separately in FIG. 1 and is used as an electrically conductive intermediate element between the spring element 24 and the cathode 18, is located between the cup 14 with the spring element 24 and the cathode 18. This support ring 30 substantially has the shape of a cup with a circular base, which has a concentric circular recess 32, and has a cylindrical wall which is perpendicular with respect to the base. The support ring 30 is, in this case, just large enough to receive the cathode 18. Before assembly of the button cell, the cathode 18 is inserted into the support ring 30, as shown in FIG. 2. If a spring element is used on the anode side, a simple metallic circular disc may also be used as the electrically conductive intermediate element instead of a support ring of this type, as at least in the example selected here with a metallic lithium tablet as the anode, no support is necessary at the edge.

The anode 16 and cathode 18 are separated from one another, as conventional, by a circular disc-shaped separator 22. In the button cells known from the prior art, the separator 22 has substantially the same diameter, however, as the anode 16 and the cathode 18, while here, as can be seen in particular in FIG. 1, the separator 22 has a larger diameter than the cathode 18 and the anode 16.

Already before assembly of the button cell, the separator 22 and the sealing element 20 are connected to one another in a fastening region 21. In order to connect the sealing element 20 to the separator 22, the inner sealing lip for example, i.e. the inner side of the U of the sealing element 20, may be coated at the top with an adhesive. The separator 22 is then placed in a centered manner on the sealing element 20 and pressed on, so an annular glued connection is obtained in the fastening region 21. Alternatively, the separator may, however, also be welded to the sealing element 20 or fastened thereto in a different manner.

FIG. 2 shows the spring element 24 connected to the sealing element 20, and it is seen that the separator 22 still extends substantially in a plane. In this case, it rests on the inner sealing lip of the U-shaped sealing element 20 and projects radially outwardly beyond said sealing lip, so its outer edge rests loosely over the opening of the U-shaped sealing element.

During assembly of the button cell shown in FIG. 3, the procedure is as follows:

Firstly, the spring element 24 is welded to the cup 14, as described above. The cathode 18 is inserted in the support ring 30. Furthermore, the separator 22, also as already described above, is connected to the sealing element 20. The lithium tablet 16, which forms the anode, is pressed into the housing cover 12 (compare FIG. 2). After carrying out these intermediate steps, the arrangement shown in FIG. 2 is obtained.

The cover 12 with the anode 16 seated therein is then urged into the seal 22 already connected to the separator 22. The edge of the housing cover 12 in the process folds the radially outer region of the separator 22, which projects outwardly over the inner sealing lip of the sealing element 20, and presses it into the position shown in FIG. 3. The separator 22 is now clamped in at its outer periphery between the housing cover 12 and the sealing element 20 and is therefore doubly secured against slipping. A division is thereby obtained of the interior of the cell into two chambers separated from one another by the separator 22. Even if particles should detach from the cathode (or the anode), these cannot move around the separator 22 and thus cause a short-circuit.

In a next step, the cathode 18 saturated beforehand with an electrolyte and inserted in the support ring 30 is placed in the sealing element 20 and on the separator 22.

Finally, the housing cup 14 is urged with the spring element 24 welded thereto onto the housing cover 12, and the button cells are closed with a press.

As is seen in FIG. 3, the circular disc-shaped base of the support ring 30 is used as a contact face for the arms 28 of the spring element 24. The arms 28 of the spring element angled in the direction of the support ring 30 and the cathode 18 press the support ring 30 away from the housing cup 14 onto the cathode 18. An electrical contact is therefore produced between the cup 14 and the cathode 18 by means of the spring element 24 and the support ring 30. Even if the cathode material is consumed, and even if the battery is subject to high mechanical stresses, high temperatures or high pressures, thanks to the construction with the spring element 24 and the support ring 30, a reliable contact is ensured.

LIST OF REFERENCE NUMERALS 12 housing cover
14 housing cup
16 anode
18 cathode
20 sealing element
21 fastening region
22 separator
24 spring element
26 central region of the spring element
28 arm of the spring element
30 support ring
32 recess in the support ring

What is claimed is:

1. A galvanic element, with a cathode, an anode, an electrolyte, a separator arranged between the anode and cathode and a housing which comprises a housing cup, a housing cover and a sealing element, the sealing element insulating the housing cup against the housing cover, having a thickness direction extending from the housing cup to the housing cover through the anode and the cathode, and a radial direction that is normal to the thickness direction,
   wherein the sealing element has a substantially U-shaped cross-section that opens toward the housing cover, wherein the sealing element has an inner sealing lip and an outer sealing lip displaced from one another in the radial direction;
   wherein the cathode is surrounded by a support ring defining a cylindrical wall in the thickness direction,
   wherein the separator further comprises a radial fastening region projecting radially at least over the inner sealing lip and a further portion bending substantially perpendicular to the radial fastening region, the further portion being parallel to the cylindrical wall in the thickness direction,
   wherein the further portion of the separator is clamped in between the housing cover and the inner sealing lip of the sealing element, and the inner sealing lip of the sealing element is clamped between the cylindrical wall and the further portion,
   wherein the sealing element has a periphery on top of the inner sealing lip comprising an annular fastening region, wherein the annular fastening region is normal to the further portion of the separator, wherein the sealing element is either welded or glued continuously along the entire annular fastening region to the separator.

2. The galvanic element according to claim 1, wherein the galvanic element comprises at least one electrically conductive spring element that is supported on the housing cup or on the housing cover, wherein the electrically conductive spring element presses the cathode or the anode in the direction of the separator by means of the support ring, wherein the support ring is electrically conductive, and wherein the cathode or the anode are in electrical contact with the housing cup or the housing cover by means of the support ring and the spring element.

3. The galvanic element according to claim 2, wherein the spring element is bonded to the housing cup or the housing cover, wherein the bonding occurs by welding.

4. The galvanic element according to claim 2, wherein the spring element has at least three spring arms, which are arranged symmetrically with respect to its centre, and in each case have a contact face, which rests on the electrically conductive intermediate element.

5. The galvanic element according to claim 2, wherein the support ring comprises a circular disc with a central recess, and wherein a diameter of the circular disk substantially corresponds to the diameter of the cathode and the anode so that the cathode fits snuggly against the circular disk.

6. The galvanic element according to claim 1, wherein the sealing element is welded to the separator.

7. The galvanic element according to claim 1, wherein the sealing element is glued to the separator.

8. The galvanic element according to claim 3, wherein the spring element has at least three spring arms, which are arranged symmetrically with respect to a center of the spring element, and wherein each spring arm has a contact face that rests on the electrically conductive intermediate element.

9. The galvanic element according to claim 3, wherein the support ring comprises a circular disc with a central recess, and wherein a diameter of the circular disk substantially corresponds to the diameter of the cathode and the anode so that the cathode fits snuggly against the circular disk.

10. The galvanic element according to claim 1, wherein the galvanic element is a button cell.

11. The galvanic element according to claim 9, wherein the galvanic element is a button cell.

* * * * *